(12) United States Patent
Skoog

(10) Patent No.: US 8,718,039 B2
(45) Date of Patent: May 6, 2014

(54) SIGNALING PROTOCOL FOR MULTI-DOMAIN OPTICAL NETWORKS

(75) Inventor: Ronald A Skoog, Bend, OR (US)

(73) Assignee: TT Government Solutions, Inc., Basking Ridge, NJ (US)

( * ) Notice: Subject to any disclaimer, the term of this patent is extended or adjusted under 35 U.S.C. 154(b) by 299 days.

(21) Appl. No.: 13/334,792

(22) Filed: Dec. 22, 2011

(65) Prior Publication Data

US 2013/0163983 A1    Jun. 27, 2013

(51) Int. Cl.
*H04L 12/28* (2006.01)

(52) U.S. Cl.
USPC .............................. 370/351; 370/252; 398/25

(58) Field of Classification Search
None
See application file for complete search history.

(56) References Cited

U.S. PATENT DOCUMENTS

| | | | |
|---|---|---|---|
| 2002/0172149 A1* | 11/2002 | Kinoshita et al. | 370/216 |
| 2003/0117950 A1* | 6/2003 | Huang | 370/220 |
| 2003/0147352 A1* | 8/2003 | Ishibashi et al. | 370/248 |
| 2003/0223359 A1 | 12/2003 | Einstein et al. | |
| 2004/0120705 A1* | 6/2004 | Friskney et al. | 398/5 |
| 2004/0190445 A1* | 9/2004 | Dziong et al. | 370/225 |
| 2004/0205239 A1* | 10/2004 | Doshi et al. | 709/241 |
| 2006/0098587 A1 | 5/2006 | Vasseur et al. | |
| 2006/0098657 A1 | 5/2006 | Vasseur et al. | |
| 2008/0170496 A1* | 7/2008 | Kano | 370/225 |
| 2009/0080886 A1 | 3/2009 | Lee et al. | |
| 2009/0310960 A1* | 12/2009 | Xu | 398/4 |
| 2010/0074623 A1 | 3/2010 | Skoog et al. | |
| 2012/0163803 A1* | 6/2012 | Zi | 398/17 |

OTHER PUBLICATIONS

M. Chamania, A. Jukan, "A Survey of Inter-Domain Peering and Provisioning Solutions for the Next Generation Optical Networks," IEEE Comm. Surveys & Tutorials, vol. 11, No. 1, 2009, pp. 33-51.
D. Truong, B. Jaumard, "Recent Progress in Dynamic Routing for Shared Protection in Multidomain Networks," IEEE Comm. Mag., Jun. 2008, pp. 112-119.
R. Casellas, R. Martinez, R. Munoz, S. Gunreben, "Enhanced Backwards Recursive Path Computation for Multi-Area Wavelength Switched Optical Networks Under Wavelength Continuity Constraint," J. Opt. Commun. Netwk., vol. 1, No. 2, Jul. 2009.
F. Ricciato, et al, "Distributed Schemes for Diverse Path Computation in Multidomain MPLS Networks," IEEE Comm. Mag., Jun. 2005, pp. 138-146.
F. Paolucci, F. et al, "Enhancing Backward Recursive PCE-based Computation (BRPC) for Inter-Domain Protected LSP Provisioning," IEEE/OSA OFC 2008, paper OTuA5.

(Continued)

*Primary Examiner* — Phirin Sam
(74) *Attorney, Agent, or Firm* — Heslin Rothenberg Farley & Mesiti P.C.

(57) ABSTRACT

A three-way handshake method for optical messaging in a multi-domain optical network that includes a first pass from a source domain to a destination domain through intermediate domains on candidate working paths, collecting information identifying available routing resources for each working path, calculating a working path metric and storing each of the metrics at the respective border node, determining a path key of the topology of each domain working path and using the path key to identify the path outside its domain and determining the best working paths and border nodes to use. A second pass using the path keys for identifying the working path in each domain and reserving the identified routing resources and selecting which routing resources to use. A third pass identifying the selected routing resources and establishing an optical signaling message path between the source node and the destination node.

18 Claims, 1 Drawing Sheet

(56) References Cited

OTHER PUBLICATIONS

X. Yang, et al, "Policy-Based Resource Management and Service Provisioning in GMPLS Networks," IEEE Infocom 2006.

C. Assi, et al, "Control and Management Protocols for Survivable Optical Mesh Networks," IEEE Journal Lightwave Tech., V. 21, No. 11, 2003.

G. Li, et al, "Efficient Distributed Restoration Path Selection for Shared Mesh Restoration," IEEE/ACM Trans. on Networking, vol. 11, No. 5, 2003.

P. Ho, "State-of-the-Art Progress in Developing Survivable Routing Schemes in Mesh WDM Networks," IEEE Comm. Surveys and Tutorials, vol. 6, No. 4, 2004, pp. 2-16.

L. Berger, "Generalized Multi-Protocol Label Switching (GMPLES) Signaling Resource Reservation Protocol—Traffic Engineering (RSVP-TE) Extensions," IETF RFC 3473, Jan. 2003.

A. Farrel, A. Ayyangar, JP. Vasseur, "Inter-Domain MPLS and GMPLS traffic Engineering-Resource Reservation Protocol—Traffic Engineering (RSVP-TE) Extensions," IETF RFC 5151, Feb. 2008.

D. L. Truong, B. Thiongane, "Dynamic Routing for Shared Path Protection in Multidomain Networks," OSA J. Opt. Net., vol. 5, No. 1, Jan. 2006, pp. 58-74.

OIF E-NNI Signaling Specification, IA# OIF-E-NNI-Sig-02.0, Apr. 16, 2009.

International Application No. PCT/US2012/067919—PCT International Search Report dated Jan. 24, 2013.

\* cited by examiner

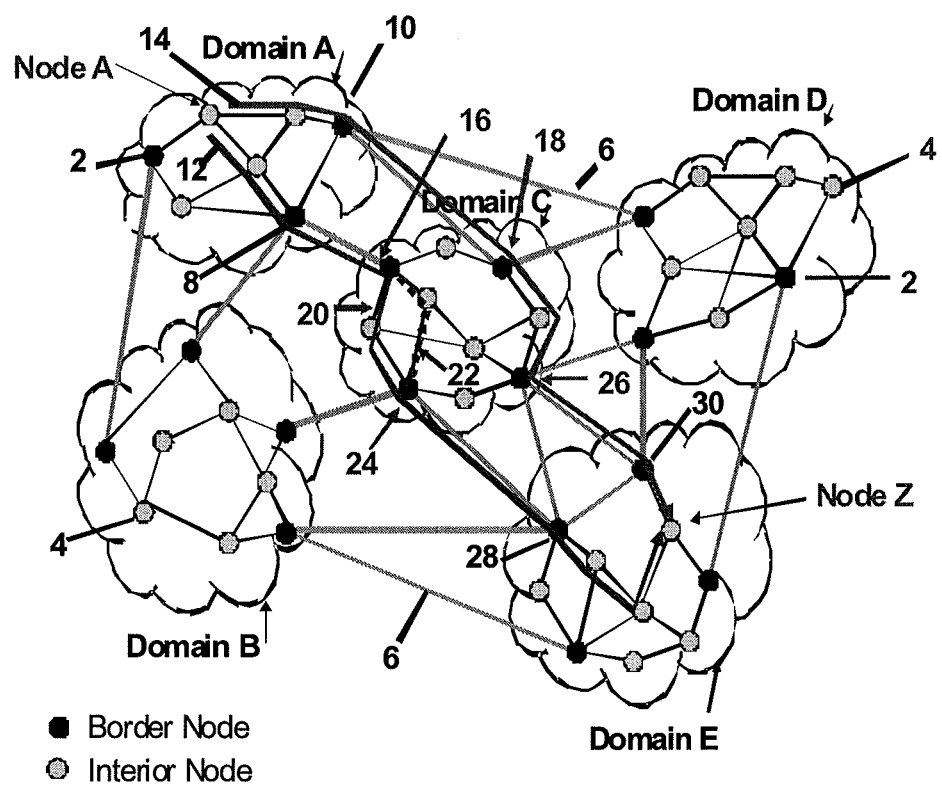

SIGNALING PROTOCOL FOR MULTI-DOMAIN OPTICAL NETWORKS

CROSS REFERENCE TO RELATED APPLICATION

This application is related to U.S. Patent Application Publication No. US 2010/0074623 A1, the disclosure of which is hereby incorporated by reference.

FIELD OF THE INVENTION

The present invention relates to optical network signals and more particularly to signaling protocols for multi-domain optical networks.

BACKGROUND OF THE INVENTION

There are numerous difficulties in setting up optical connections in a multi-domain Wavelength Division Multiplex (WDM) optical network. Multi-Domain means that there are interconnected optical network domains. Each optical network domain is operated by a different administrative entity; typically each administrative entity is a telecommunications carrier. A multi-domain optical network requires setting up point-to-point optical connections that have their end-points in different domains. One important goal is to be able to set up end-end multi-domain connections very quickly (e.g., ranging from 100 ms to a few seconds). Another important goal is that within each domain it is desired to have the connectivity be as much all-optical as possible. However, the optical channel interconnection between domains must go through Optical-Electrical-Optical (OEO) processing on each end of a link connecting two domains. This is because the OEO functionality optically isolates the two domains from one another. Within a domain, OEO is used to do wavelength conversion or regeneration as described below. The OEO functionality at one end of a link is provided by two back-to-back transponders. The optical connection between domains is called an External Network Node Interface (E-NNI) and has been standardized by the Optical Internetworking Forum (OIF).

Within a domain, the optical network consists of optical switches, fiber connecting the optical switches, and WDM technology used to carry multiple wavelengths (optical channels) in a fiber. The optical switches are either Reconfigurable Optical Add-Drop Multiplexers (ROADMs) or Optical Cross Connects (OXCs). ROADMs can be viewed as small OXCs (i.e., they connect to a small number of fibers). ROADMs and OXCs have add/drop ports that connect to client ports, and optical connections between client add/drop ports are set up through the ROADM and OXC optical switching fabrics. An optical connection is set up through multiple fibers. A basic connection within a domain consists of a single wavelength channel, and the frequency of the wavelength channel is the same frequency in each fiber the connection goes through. The ROADMs and OXCs cross-connect the wavelength used by the connection from one fiber to the other. In order for a single wavelength to be used from domain border node to domain border node for a connection, there must be a fiber path between the domain border nodes that has that wavelength available on each fiber in the path (i.e., it is not being used for another connection on any of the fibers along the fiber path). This is known as the "Wavelength Continuity Constraint" (WCC).

If within a domain a single wavelength is not available in each fiber along a fiber path, the connection can be established using wavelength conversion (OEO) within the ROADMs or OXCs connecting two fibers that require different wavelengths. However, not every node will support dynamic provisioning of transponders, so wavelength conversion can only be done at nodes equipped with transponder pools. It is desirable to minimize the amount of wavelength conversion required, since the transponders used to do the wavelength conversion are expensive. A wavelength conversion requires two back-to-back transponders. Thus, an important part of setting up optical connections within a domain is having information available to be able to determine what wavelengths are available in the different fibers and what OXCs/ROADMs have available transponders to do the OEO wavelength conversion. This information is needed to efficiently set up optical connections within a domain.

Another aspect of setting up optical connections is that some services provide restoration or 1+1 protection after a failure (e.g., fiber cut) causes the working channel to fail. One type of restoration is known as end-to-end "Shared Mesh Restoration." In this method of restoration an end-to-end restoration path that is diverse from the working path is determined as part of the connection provisioning process. The restoration paths are only set up after a failure occurs, so if two working connections do not share any failure modes, they can both "share" the same restoration resources. Thus, for provisioning connections using shared mesh restoration, it is important to be able to identify what wavelengths on different fibers can be shared for restoration.

In 1+1 protection a working path and a diverse, dedicated protection path are set up. When a failure occurs on the working path, both ends of the connection switch to the diverse protection path. Thus, when a 1+1 connection is set up, both a working path and a diverse protection path must be determined and set up.

Another important aspect of the problem of setting up optical connections is that routing must be done to determine what route a connection will take (if a shared mesh restoration path or 1+1 protection path is to be provided, then that diverse restoration/protection path must also be determined). It must be determined what domains will be used to provide the connection (and restoration/protection) path, what border nodes will be used to go in and out of each domain, and what route will be used in each domain to connect the chosen border nodes (or a connection end node and a border node). An important constraint is that network operators want to keep their network topology and capacity usage information private, so detailed routing information (network topology and network state) cannot be shared across domains, and detailed routing information within a domain must be generated and kept within that domain.

There have been previous approaches to routing and setting up connections in a multi-domain optical network. There are two basic approaches that have been used to determine the routing of the working and restoration/protection paths. One is called the Per-Domain Approach and the other is called the Backward Recursive Path Computation (BRPC) approach. In either approach the methods assume that for a particular source-destination node-pair there is a pre-determined sequence of domains (Domain 1, 2, . . . N) and candidate domain border nodes that will be used for determining the working paths.

Paths are computed using link cost metrics, and minimum cost paths are computed. For working paths the metric is typically based on the latest recorded spare capacity on the link and link weighting factors the carrier assigns to the link. The link routing information is sometimes distributed by a domain routing protocol such as OSPF-TE (IETF RFC 4203). Route computation can either be done by the domain border nodes or by a Path Computation Element (PCE). In multi-domain networks a PCE is usually used since it can more easily communicate with other domain PCEs. For the previous methods described here, all routing is done by PCEs.

In the per-domain approach the path computation is done one domain at a time, starting at the source node. First a minimum cost working path from the source node to each of the candidate domain border nodes is determined, and the border node having the least cost path is chosen. This determines the egress border node from the source domain and the candidate ingress border nodes in the next domain that will be used. In the next domain, an optimal path from each candidate ingress border node to each candidate egress border node is determined. The minimum cost ingress node to egress node path is chosen for traversing that domain. This process is continued from domain to domain until the destination domain is reached. At the destination domain, a minimum cost path is determined from the ingress border node to the destination node. Note that this methodology does not necessarily find the minimum cost end-to-end path.

In the BRPC approach, the process begins at the destination node in Domain N. Minimum cost paths are computed from each potential ingress border node to destination D. This gives a Virtual Shortest Path Tree (VSPT) between the border nodes of Domain N and Destination D. This VSPT is attached to the candidate egress border nodes of the previous domain, Domain (N−1). Minimum cost paths from each ingress border node of Domain (N−1) to destination D are then computed. This gives a VSPT from Domain (N−1) ingress nodes to destination D. This is done recursively until a minimum cost path from the source to destination is determined.

RSVP-TE signaling, extended for GMPLS (RFC 3473), is used to establish the connections, which includes determining what wavelengths will be used and where wavelength conversion needs to be done. This is done after the routing has been done, so the routing decisions described above do not consider wavelength conversion requirements.

The prior solutions, however, has failed to completely solve the problem of setting up optical connections in a multi-domain network. In previous solutions, for each connection request a multi-domain routing function must be performed to determine the working path and, when restoration or 1+1 protection is provided, a restoration/protection path. After that routing work is done, signaling must be done to set up the working path. In the previous methods, this routing function takes significant time (e.g., hundreds of ms) and would not be able to meet setup times on the order of 100 ms.

Most of the previous solutions do not include providing shared restoration or 1+1 protection capability. One prior approach attempts to enhance the BRPC approach to include computation of a 1+1 protection path. Also, the 1+1 method used in previous work requires the protection path to go through the same domains as the working path.

Another prior approach uses solutions that provide shared restoration within the domains, but this methodology does not protect against failure of border nodes or failure of links connecting border nodes (i.e., links connecting two domains). Thus, additional capabilities are needed to provide full protection of working connections.

None of the previous solutions address the optimization of the use of wavelength conversion within a domain when the Wavelength Continuity Constraint (WCC) cannot be satisfied end-to-end within a domain. For example, one prior solution blocks connection requests when the WCC cannot be met. It is widely recognized that wavelength conversion capability is essential in optical networks in order to get efficient use of the optical resources. However, wavelength conversion requires expensive transponders, and so it is highly desirable to have provisioning methods that can minimize the amount of wavelength conversion required.

A multi-domain optical network provisioning methodology that keeps resource information private in each domain, but optimizes connection setup equivalent to full information sharing across domains is disclosed.

SUMMARY OF THE INVENTION

A multi-domain optical network provisioning methodology that keeps resource information private in each domain, but optimizes connection setup equivalent to full information sharing across domains is disclosed. The present invention considers both shared mesh restoration and dedicated 1+1 protection. Shared mesh restoration is much more efficient than dedicated 1+1 protection, but 1+1 protection has a faster recovery time than shared mesh restoration. The present invention provides the capability to minimize the amount of wavelength conversion required. In optical networks providing shared mesh restoration or 1+1 protection, it is desirable to consider many possible paths for the working and restoration/protection paths, and optimize the choice of what paths to use for working and restoration/protection so as to minimize the total resources consumed for the connection. For working path choices it is desirable to minimize the path length and the amount of wavelength conversion required. For the shared restoration path it is desirable to use as much shared capacity as possible, so the amount of additional wavelength capacity reserved for restoration is minimized. For the 1+1 working and protection path choices it is desirable to minimize the combined working and protection path length and the combined working and protection path use of wavelength conversion. The present invention collects information that allows these resource usage considerations to be made. In addition, the present invention collects information in each domain and passes on summary information for each domain so that an optimal choice of end-to-end working and restoration/protection paths can be made that is equivalent to what can be achieved with a centralized entity (e.g., a PCE) having a global view of the multi-domain network state. This is highly significant, because the constraint that detailed topology and network state information cannot be shared across domains precludes such a centralized capability. Thus, the present solution achieves a centralized global optimality without violating the sharing of information across domains.

The present invention, in one exemplary embodiment, is directed to a method for optical signaling message processing in a multi-domain optical network, each domain having one or more border nodes, one or more intermediate nodes and a plurality of links connecting the nodes to form a plurality of paths through the domain. The method comprising the steps of sending first pass signaling messages from a source node in a source domain to a destination node in a destination domain through one or more intermediate domains, the first pass signaling messages being sent on a plurality of candidate diverse domain border node paths, each border node path having a unique path topology. The first pass signaling messages comprises collecting first pass information identifying available working and restoration resources for each candidate border node path. For a particular domain and pair of border nodes there can be multiple paths connecting the two border nodes. A Pass 1 signaling message is sent on each of the paths to collect working and restoration resource information. The exit border node computes a working and restoration metric for each path. It then determines the best working and restoration path metric. It then composes a Pass 1 signaling message to the next domain border node in the border node path being probed. The Pass 1 signaling message contains a Path Key for the best working path and its working path metric. The Pass 1 message also contains a Path Key for the best restoration path and its restoration path metric. The Path Keys provide the means to identify a path and it's metric outside the domain without providing any detailed network topology information. The Pass 1 signaling message continues to gather Path Key and working and restoration metrics along the border node path, and at the destination domain the destination node receives all of the Pass 1 working and restoration metric information (including information for the destination domain between the border node and the destination node). With this collected information from all probed border node paths, the destination node can determine the best working and restoration border node paths to use for a shared mesh restoration connection, and it can determine the best pair of border node paths to use for a 1+1 protected connection.

The method further comprises sending a second pass signaling message from the destination node to the source node along the selected domain working paths and selected border nodes using the path keys to identify the chosen paths for each domain, the second pass signaling message reserving the identified routing resources within the selected domain working paths and selected border nodes, determining at the source node which of the identified signaling message routing resources were successfully reserved, and selecting at the source node which successful identified routing resources to use.

The method also comprises sending a third pass signaling message from the source node to the destination node along the selected domain working paths and selected border nodes identifying the selected routing resources, and establishing an optical path between the source node and the destination node along the selected domain working path and selected border nodes using the selected routing resources.

In another embodiment, the method includes, for shared mesh restoration, a second pass signaling message reserving restoration resources for the identified working resources, determining at the source node which restoration routing resources were successfully reserved, and selecting at the source node which successful restoration routing resources to use, identifying the selected resources during the third pass signaling message, and using the selected restoration resources for restoring the working connection in the event of a failure.

In a further embodiment, the method includes for a 1+1 protected connection during the first pass signaling message, for each candidate domain working path for each domain, collecting information relating to 1+1 protection capacity, calculating a domain 1+1 protection metric representing the collected 1+1 protection capacity information and storing each of the domain 1+1 protection metrics at the respective border node within each candidate working path in each domain, determining at the destination node a selected 1+1 protection path from one of the candidate 1+1 protection paths to use in each domain based on the 1+1 protection path metrics from each domain, sending a 1+1 protection pass signaling message from the destination node to the source node along the selected 1+1 protection path, and reserving 1+1 protection resources within each domain using the domain path key for the selected 1+1 protection path.

BRIEF DESCRIPTION OF THE DRAWINGS

These and other features, benefits, and advantages of the present invention will become apparent by reference to the following figures, with like reference numbers referring to like structures across the views, wherein:

The FIGURE is a schematic illustration which illustrates the method according to the present invention.

DETAILED DESCRIPTION

The FIGURE shows an illustration of a multi-domain network. There are five domains (A, B, C, D, and E) each illustrated as a network within a cloud. Domain border nodes 2 are represented as black circles, and domain interior nodes (non-border nodes) 4 are represented as shaded circles. Border nodes are used to connect from one domain to another. Connections between border nodes in different domains are represented by links 6. As indicated above, these links are known as E-NNI links, and OEO processing is done on each end of the E-NNI link. Therefore there is no need to consider maintaining wavelength continuity between these links and links they connect to within a domain. The present invention is concerned with how to quickly set up wavelength connections between two nodes in different domains. A wavelength connection can consist of one or more wavelength channels. For purposes of simplicity only, the specification will restrict description to setting up a single wavelength channel.

In one embodiment, the methodology assumes that there are pre-computed domain-to-domain paths. The domain-to-domain paths are identified by the sequence of border nodes they go through. For example, there may be four domain-to-domain paths connecting Domain A and Domain E. This embodiment also assumes at there are pre-computed paths from each interior node to each domain border node and there are pre-computed paths between all border node pairs in a domain. When a connection request arrives for a wavelength connection, between a source node, Node A in Domain A, and a destination node, Node Z in Domain E, it must be determined what A-to-Z working path will be used and what A-to-Z diverse restoration path or 1+1 protection path will be used for the connection.

Consider first the working path. It must be determined what border node path will be used, what path from Node A to the chosen border node in Domain A to use, what path to use between border nodes in each intermediate domain and what path to use from the border node in Domain E to Node Z. Similarly, an end-end (A to Z) restoration path or 1+1 protection path must be determined that is diverse from the working path.

The multi-domain signaling procedure of the present invention is a 3-way handshake (3WHS) process that involves three passes of signaling messages. In Pass 1, signaling messages (called Pass 1 messages) are sent from Node A to Node Z on each candidate border node path to collect information on the available resources in each domain. When all of the Pass 1 messages arrive at Node Z, it determines, based on the collected resource information, which border node path to use for the working path and which to use for the restoration path. Node Z also determines the specific intra-domain working path and restoration or 1+1 protection path to use from Node Z to the selected working and restoration/protection border nodes in its domain. Node Z then sends Pass 2 signaling messages back to Node A on the selected working and restoration/protection paths to reserve resources and initiate switch cross-connects on the working path. Extra resources are reserved on the working and 1+1 protection path in Pass 2 to protect against blocking due to a selected resource from being occupied by another connection before the Pass 2 message can reserve them. When the working path Pass 2 messages reach Node A, it will know which connection reservations were successful, and it will choose which successful connections to use. If 1+1 protection is being used, Node A will know which 1+1 protection reservations were successful, and it will choose which successful connections to use. Node A then sends a working path Pass 3 message to Node Z indicating the selected resources. In addition the working path Pass 3 message signals the release of any extra reserved resources that are not needed. Node A also sends a Pass 3 restoration/protection path message indicating the success or failure of reserving resources on the restoration path or the 1+1 protection path. The detailed 3WHS procedures are described below.

The FIGURE illustrates the 3WHS procedure of the present invention with respect to a connection setup between Node A in Domain A and Node Z in Domain E. In this exemplary embodiment, two border paths are used. Node A sends a Pass 1 signaling message to each of the two border nodes 8, 10. To simplify the discussion, we assume in this example that, for each of the border nodes, Node A uses a single path from itself to the border node. In the general case there can be multiple paths from Node A to each border node, each is probed with a Pass 1 message, and an optimal choice of which path to use is made at the border node based on the collected Pass 1 information. The Pass 1 signaling messages will follow paths 12, 14 to the border nodes 8, 10 respectively. Each Pass 1 message collects for each link on its path to the border nodes the available wavelengths on each link and the available transponders at each node. Also for each link it collects the amount of capacity currently reserved for restoration and the identification of the failure modes that would require all of the reserved capacity on the link to be used for restoration. The failure mode identification labels are called Shared Risk Link Groups, or SRLGs. If a new working path being set up is using a particular link, in its restoration path and that working path does not have any of the SRLGs that require all of the link reserved capacity to be used, then no additional reserve capacity is needed on the link to protect the new working path. If the new working path does have an SRLG that currently requires all of the link's reserve capacity, then an additional channel will need to be reserved for restoration on the link to protect the new working path connection. Thus, the SRLG information collected by the Pass 1 message will allow restoration metrics to be computed as described below.

When each of the Pass 1 messages reach their border node, the border node computes a working path metric and a restoration path metric for the path traversed. The working path metrics are the lightpath km from Node A to the border node along the path and the minimum number of wavelength converters required (based on the available wavelengths on each link) to establish a lightpath from Node A to the border node. For 1+1 protection, the 1+1 protection metric is the same as the working path metric. The restoration metric is a list of the SRLGs that require all the reserved capacity on one or more links, and associated with each of the SRLGs on the list is the total link km of those links for which that SRLG requires all their reserved capacity if that SRLG fails. This working and restoration metric information is stored at the border nodes. In addition, each of the Node A to border node paths 12, 14 has a Path Key to be used for path identification outside the domain. One example of a Path Key mechanism to preserve topology confidentiality is defined in IETF RFC 5520. Thus, by using path keys, the path metric information can be disseminated outside the domain without identifying any specific network topology information. It is noted that the border nodes do not put specific wavelength information in the Pass 1 messages it sends to the next domain. The border node stores the wavelength choices it has made for its domain working paths and 1+1 protection paths.

The next step is that a Pass 1 message is composed at each of the border nodes 8, 10 to be sent to the border nodes 16, 18 in the next domain (Domain C). Each Pass 1 message contains the path key for the path from the border node in Domain A to Node A and the working and restoration metrics for that Domain A path. From node 16 there are two paths 20, 22 to the next border node 24. The Pass 1 message is replicated and one copy is sent along Path 20 and the other along Path 22. These Path 1 messages pick up, as before, the available wavelengths on each link, the number of transponders available at each node, the reserved restoration capacity on each link and the SRLGs that require all of the reserved capacity if they fail. When the Pass 1 messages reach the border node 24, the working and restoration metrics are computed for paths 20 and 22 in the same manner as described above for Domain A. The wavelength choices on each link and where wavelength conversion is done is stored at node 24. Then a Pass 1 message is composed to be sent to the next border node in Domain E. The Path 1 message contains the Path 20 working and restoration metrics and an associated Path Key representing Path 20. The Path 1 message also contains the Path 22 working and restoration metrics and an associated Path Key representing Path 22.

There is also a Pass 1 message sent from Node 18 to Node 26 in Domain C, and this message picks up the working and restoration metric information along that Domain C path. Analogous to the Path 20 and Path 22 cases, the wavelength choices on each link and where wavelength conversion is done is stored at Node 26. Also, the Node 18 to Node 26 path working and restoration metric information is stored at Node 26 and placed in a Pass 1 message to be sent to the next border node in Domain E. Again, path keys are used to identify the paths within Domain C, so no specific topology information is sent outside a domain.

The process continues in Domain E, where the two border nodes 28, 30 receive the Pass 1 signaling messages and send them on the indicated paths to Node Z. Node Z then has a Pass 1 message for each of the three probed A-to-Z paths. For each path it has working and restoration metric information. Note that working metric information is used for determining the path metric for working paths and 1+1 protection paths. From this collected metric information, Node Z can determine a diverse working and restoration path pair (or a diverse working and 1+1 protection path pair) that minimizes a total path pair metric. For example, for working path metrics and 1+1 protection path metrics, the total wavelength-km of the path plus an equivalent wavelength-km for each wavelength converter or regenerator can be used to determine an overall working/protection wavelength-km metric for the path. For a restoration path metric, the total additional wavelength-km of reserved capacity required can be used. Node Z can then consider each possible diverse path pair and compute a combined working plus restoration/protection metric, and choose the path pair that has the lowest metric. This process also identifies which path is the working path and which is the restoration path. It should be noted that there are many other possibilities for defining working and restoration metrics, and many possible algorithms Node Z can use to choose an optimal working/restoration path pair.

At node Z there is information stored that identifies for each Path Key what SRLGs are associated with that path. With this information at hand, when Node Z receives the Pass 1 information it can compute the restoration metric for a path when a candidate working path is provided in the form of Path Keys. The Path Keys of the candidate working path are translated into a set of SRLGs for that candidate working path. Those SRLGs are matched against the SRLGs that trigger additional reservations on the proposed restoration path to get an overall metric of lambda-km of additional reserved wavelength required on the proposed restoration path.

After receiving and processing the Pass 1 messages, Node Z then sends a Pass 2 signaling message along the selected working path to reserve the selected resources. In order to protect against blocking (called Backward Blocking) caused by resources that were selected in Pass 1 and are taken by another connection before the Pass 2 message can reserve them, additional lightpaths (resources) are reserved in Pass 2. For a single wavelength connection, this would generally be just one additional lightpath. For multiple wavelength connections it will be more. The number of additional lightpaths that are reserved is chosen to meet a desired Backward Blocking probability. For example, a backward blocking probability of $10^{-4}$ is used when the call blocking requirement is $10^{-3}$.

In this example, for the working path, Node Z chooses the path using nodes 28, 24, 16, 8 with sub-path 20 to be used in Domain C. The path using nodes 30, 26, 18, 10 would be used for the restoration path. Node Z then sends a working Pass 2 message along the working path and a restoration/protection Pass 2 message along the restoration/protection path. On the selected working path, and on selected 1+1 protection paths, the Pass 2 message initiates cross-connects at each switch for the selected wavelengths. If wavelength conversion or regeneration is required at a node, the Pass 2 message initiates that connection as well. The Pass 2 message does not wait for the connections to be completed; it continues on to establish the rest of the path.

When the working Pass 2 message enters a new domain, such as border node Node 24, the path information in the Pass 2 message needs to be expanded. Node Z used the received Path Keys to identify in the Pass 2 message what paths were to be used for the connection. Therefore, when the Pass 2 message arrives at Node 24, it must translate the Path Key into the actual path. In this case the actual path is Path 20. In addition, Node 24 needs to provide what wavelengths are to be used on each link and where wavelength conversion must be done. All this information was stored in Node 24 when the Pass 1 message was processed. The expanded Pass 2 message is then sent along the working path to the next border node, Node 16. At Node 16 the expanded Pass 2 information is removed and replaced with the Path Key, and the Pass 2 message is sent to the next border node 8 in Domain A. That border node 8 expands the Path Key information for that domain into the actual path, wavelengths to use on each link and where wavelength conversion is required. Again, this information was stored when the Pass 1 message was processed.

The expanded working path Pass 2 message is then sent along the working path to Node A, and the Pass 2 message initiates the cross-connects and wavelength conversions specified in the expanded routing information. Node A then determines which successful lightpath will be used and sends a Pass 3 message back toward Node Z to release the resources it did not select. Node A also initiates the cross-connect to the client ports.

When the Pass 3 message arrives at the border Node 8 it is passed to Node 16 in the next domain. Border node 16 will have selected the successful lightpath it will use in Domain C, and it sends a Pass 3 message along the working path to release the extra resources it will not use. Note that the Pass 3 message is also informing all of the switches along the working path that the connection has been successful. This process of sending Pass 3 messages continues all the way back to Node Z. When the Pass 3 message reaches Node Z it will know that the connection is successful, and it will also know which lightpath was selected for the connection. It will then initiate the connectivity to the client ports.

It should be noted that if on Pass 2 a connection setup fails, a connection teardown message will be sent to kill the call.

For the restoration path a Pass 2 message is sent, but it just reserves wavelength resources for restoration and does not setup any cross-connects. Extra resources are not reserved since there is a negligible probability of blockage. As indicated above, for 1+1 protection, the protection path is set up with Pass 2 and Pass 3 signaling messages the same way the working path is set up.

In the present invention, the routing and connection setup are done in one process, and therefore the invention is capable of significantly shorter setup time. For example, the present invention can achieve setup times on the order of 50 ms plus the round-trip fiber delay. The present invention bases the routing decisions on detailed information in each domain concerning wavelengths available on each link, transponders available at each node, etc. Furthermore, the present invention optimizes the choice of end-to-end working and restoration/protection diverse path-pairs based on this detailed domain information without violating the requirement of not sharing topology or resource information between domains. The present invention can establish multi-domain connections on the order of 50 ms+round-trip fiber delay. Other solutions have setup times on the order of seconds.

The present invention can optimize the choice of working and restoration path pair based on detailed resource information collected in each domain, no detailed information is shared between domains, but the optimized choices are equivalent to what would be obtained with full sharing of information between domains. Moreover, the invention minimizes the use of transponders for wavelength conversion and regeneration on the working and 1+1 protection paths, and it minimizes the amount of reserved wavelength capacity on the restoration paths.

The present invention considers multiple domain sequence paths, and the restoration path can use a different domain path than that used by the working path. The present invention collects current network state information on multiple diverse paths, and makes an optimal decision on working and restoration/protection path choices that is equivalent to making that decision with global network state information. In doing this, the present invention maintains the privacy of each domain's state information, and the global method does not.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method for optical signaling message processing in a multi-domain optical network, each domain having one or more border nodes, one or more intermediate nodes and a plurality of links connecting the nodes to form a plurality of paths through the domain, the method comprising the steps of:
   sending a first pass signaling message from a source domain to a destination domain through one or more intermediate domains, the first pass signaling message being sent on a plurality of candidate domain working paths having a unique path topology, wherein sending the first pass signaling message comprises:
      collecting first pass information identifying available signaling message routing resources for each candidate domain working path at a respective border node in each domain;
      calculating a domain working path metric representative of the collected first pass information for each candidate domain working path and storing each of the domain working path metrics at the respective border node within each candidate working path in each domain; and
      determining a domain path key representing the unique topology of each candidate domain working path and storing each of the domain path keys at the respective border node within each candidate working path in each domain;
   determining at the destination node selected domain working paths and selected border nodes to use in each domain based on the domain working path metrics from each domain;
   sending a second pass signaling message from the destination node to the source node along the selected domain working paths and selected border nodes using the domain path key for each domain, the second pass signaling message reserving the identified routing resources within the selected domain working paths and selected border nodes;
   determining at the source node which of the identified routing resources were successfully reserved;
   selecting at the source node which successful identified routing resources to use;
   sending a third pass signaling message from the source node to the destination node along the selected domain working paths and selected border nodes identifying the selected routing resources; and
   establishing an optical working path between the source node and the destination node along the selected domain working paths and selected border nodes using the selected routing resources.

2. The method of claim 1 further including the steps of:
   during the second pass signaling message reserving back-up routing resources for the identified resources, determining at the source node which back-up routing resources were successfully reserved, and selecting at the source node which successful back-up routing resources to use;
   identifying the selected back-up routing resources during the third pass signaling message; and
   using the selected restoration back-up routing resources for establishing an optical path between the source node and the destination node in the event of a working path failure.

3. The method of claim 1 further including the step during the second pass signaling message of initiating cross-connects at each switch within each selected candidate working path.

4. The method of claim 1 wherein the available routing resources include available wavelengths.

5. The method of claim 4 wherein the available routing resources includes available transponders.

6. The method of claim 1, further including the steps of:
   during the first pass signaling message, for each candidate domain working path for each domain, collecting information relating to restoration capacity, calculating a domain restoration metric representing the collected restoration capacity information and storing each of the domain restoration metrics at the respective border node within each candidate working path in each domain;
   determining at the destination node a selected restoration path from one of the candidate restoration paths to use in each domain based on the restoration path metrics from each domain;
   sending a restoration pass signaling message from the destination node to the source node along the selected restoration path, and reserving routing resources within the selected restoration path using the domain path key to identify the selected restoration path.

7. The method of claim 1 wherein each candidate domain working path includes a plurality of paths through a plurality of intermediate nodes and links to each of one or more border nodes; and selecting at the destination node an optimal path based on collected first pass information for use as the path for each candidate domain working path.

8. The method of claim 6, wherein the collecting step includes collecting current reserved restoration capacity and capacity required for failure modes and wherein the calculating step is performed if any failure modes require all the reserved restoration capacity.

9. The method of claim 1, wherein the step of calculating the domain working path metrics includes detecting a lightpath length and a minimum number of wavelength converters required to establish a lightpath on each candidate working path for each domain.

10. The method of claim 8, wherein the domain restoration metric includes the lightpath length of the links for which the failure mode requires all the reserved capacity if the link fails.

11. The method of claim 1, wherein each candidate domain working path has a unique topology of border nodes and intermediate nodes connected by links, and wherein each domain working path key identifies the unique topology of its respective candidate domain working path.

12. The method of claim 9, wherein the step of determining selected domain working paths includes determining an equivalent lightpath length for each wavelength converter and combining with the lightpath determined length for each candidate source node to destination node working path.

13. The method of claim 6, further comprising determining a combined working path and restoration path pair metric.

14. The method of claim 1, further including reserving backup resources during the second pass signaling message.

15. The method of claim 14, further including releasing unused backup resources during the third pass signaling message.

16. A method for optical signaling processing in a multi-domain optical network, each domain having one or more border nodes and one or more intermediate nodes, the method comprising the steps of:

sending a first signaling pass from a source domain to a destination domain through one or more intermediate domains, the first signaling pass comprising:

sending a plurality of first intra-domain signaling messages from a first node to one or more source domain border nodes on a respective plurality of candidate source domain working paths within the source domain;

collecting information identifying available resources along each candidate source domain working path;

calculating a respective source domain working path metric representative of the collected information for each candidate source domain working path and storing each of the source domain working path metrics at the respective one or more source domain border nodes of each candidate source domain working path;

determining a respective source domain working path key for each source domain working path metric and storing each of the source domain working path keys at the respective one or more source domain border nodes of each candidate source domain working path;

sending a plurality of first pass inter-domain signaling messages from the one or more source domain border nodes to one or more intermediate border nodes of a first intermediate domain, the first inter-domain signaling messages containing the source domain working path security keys and their associated working path metrics;

sending a plurality of second intra-domain signaling messages from the one or more first intermediate border nodes to one or more second intermediate border nodes on a respective plurality of candidate first intermediate domain working paths within the first intermediate domain;

collecting information identifying available routing resources along each candidate first intermediate domain working path;

calculating a respective first intermediate domain working path metric representative of the collected information for each candidate first intermediate domain working path and storing each of the first intermediate domain working path metrics at the respective one or more second intermediate border nodes of each candidate first intermediate domain working path;

determining a respective first intermediate domain working path security key for each first intermediate domain working path metric and storing each of the first intermediate domain working path security keys at the respective one or more second intermediate border nodes of each candidate first intermediate domain working path;

sending a plurality of second inter-domain signaling messages from the one or more second intermediate domain border nodes to one or more destination border nodes of the destination domain, the second inter-domain signaling messages comprising the source domain and the first intermediate domain working path security keys and working path metrics;

sending a plurality of third intra-domain signaling messages from the one or more destination border nodes of the destination domain to the destination node on a respective plurality of candidate destination domain working paths within the destination domain;

collecting information identifying available signal routing resources along each candidate destination domain working path;

calculating a respective destination domain working path metric representative of the collected information for each candidate destination domain working path and storing each of the destination domain working path metrics at the destination node;

determining a respective destination domain working path security key for each destination domain working path metric and storing each of the destination domain working path security keys at the destination node;

determining at the destination node selected working paths and selected border nodes to use in each domain based on the working path metrics from each domain;

sending a second signaling pass from the destination node to the source node along the selected working paths and selected border nodes using the working path security keys for each domain, the second signaling pass reserving the identified routing resources within the selected working paths and selected border nodes; the second signaling pass reserving back-up routing resources for the identified resources;

determining at the source node which of the identified signal routing resources were successfully reserved and which back-up routing resources were successfully reserved;

selecting at the source node which successful identified and back-up routing resources to use;

sending a third signaling pass from the source node to the destination node along the selected working paths and selected border nodes identifying the selected routing resources, and establishing an optical path between the source node and the destination node along the selected working paths and selected border nodes using the selected routing resources.

17. A computer readable storage device having a computer readable program for operating a computer, the program comprising instructions that causes the computer to perform the steps of:

sending a first pass signaling message from a source domain to a destination domain through one or more intermediate domains, the first pass signaling message being sent on a plurality of candidate domain working paths having a unique path topology, wherein sending the first pass signaling message comprises:

collecting first pass information identifying available signaling message routing resources for each candidate domain working path at a respective border node in each domain;

calculating a domain working path metric representative of the collected first pass information for each candidate domain working path and storing each of the domain working path metrics at the respective border node within each candidate working path in each domain;

determining a domain path key representing the unique topology of each candidate domain working path and storing each of the domain path keys at the respective border node within each candidate working path in each domain; and determining at the destination node selected domain working paths and selected border nodes to use in each domain based on the domain working path metrics from each domain;

sending a second pass signaling message from the destination node to the source node along the selected domain working paths and selected border nodes using the path keys to identify the selected paths for each domain, the second pass signaling message reserving the identified routing resources within the selected domain working paths and selected border nodes;

determining at the source node which of the identified routing resources were successfully reserved;

selecting at the source node which successful identified routing resources to use;

sending a third pass signaling message from the source node to the destination node along the selected domain working paths and selected border nodes identifying the selected routing resources, and establishing an optical path between the source node and the destination node along the selected domain working paths and selected border nodes using the selected routing resources.

18. A method for optical signaling message processing in a multi-domain optical network, each domain having one or more border nodes, one or more intermediate nodes and a plurality of links connecting the nodes to form a plurality of paths through the domain, the method comprising the steps of:

sending a first pass signaling message from a source domain to a destination domain through one or more intermediate domains, the first pass signaling message being sent on a plurality of candidate domain working and protection paths having a unique path topology, wherein sending the first pass signaling message comprises:

collecting first pass information identifying available routing resources for each candidate domain working and protection path at a respective border node in each domain;

calculating a domain working and protection path metric representative of the collected first pass information for each candidate domain working and protection path and storing each of the domain working and protection path metrics at the respective border node within each candidate working and protection path in each domain; and determining a domain path key representing the unique topology of each candidate domain working and protection path and storing each of the domain path keys at the respective border node within each candidate working and protection path in each domain;

determining at the destination node selected domain working paths and selected border nodes to use in each domain based on the domain working path metrics from each domain;

for 1+1 protection determining at the destination node selected domain protection paths and selected border nodes to use in each domain based on the working and protection path metrics from each domain;

sending a second pass signaling message from the destination node to the source node along the selected domain working paths and selected border nodes using the domain path key for each domain, the second pass signaling message reserving the identified routing resources within the selected domain working paths and selected border nodes;

for 1+1 protection sending a second pass signaling message from the destination node to the source node along the selected domain protection paths and selected border nodes using the domain path key for each domain, the second pass signaling message reserving the identified routing resources within the selected domain protection paths and selected border nodes;

determining at the source node which of the identified routing resources were successfully reserved;

selecting at the source node which successful identified routing resources to use for working and 1+1 protection;

sending a third pass signaling message from the source node to the destination node along the selected domain working paths, selected domain protection paths, and selected border nodes identifying the selected routing and 1+1 protection resources;

establishing an optical working path between the source node and the destination node along the selected domain working paths and selected border nodes using the selected routing resources; and for 1+1 protection establishing an optical protection path between the source node and the destination node along the selected domain protection paths and selected border nodes using the selected routing resources.

* * * * *

UNITED STATES PATENT AND TRADEMARK OFFICE
CERTIFICATE OF CORRECTION

PATENT NO. : 8,718,039 B2  
APPLICATION NO. : 13/334792  
DATED : May 6, 2014  
INVENTOR(S) : Ronald A. Skoog It is certified that error appears in the above-identified patent and that said Letters Patent is hereby corrected as shown below:

In the Specification

After The Cross Reference To Related Applications Sentence and before the Field of Invention Section, Insert the following:

Column 1, Line 11: -- STATEMENT REGARDING FEDERALLY SPONSORED RESEARCH OR DEVELOPMENT The disclosed invention was made with government support under contract No. W911QW-10-C-0094 awarded by Army Research Labs. The government has certain rights in the present invention. --

Signed and Sealed this  
Eighteenth Day of November, 2014

Michelle K. Lee  
*Deputy Director of the United States Patent and Trademark Office*